April 24, 1962 W. H. RAMBO ETAL 3,031,061
AUTOMATIC UNIT FEEDING AND SPACING MECHANISM
Filed Nov. 24, 1953
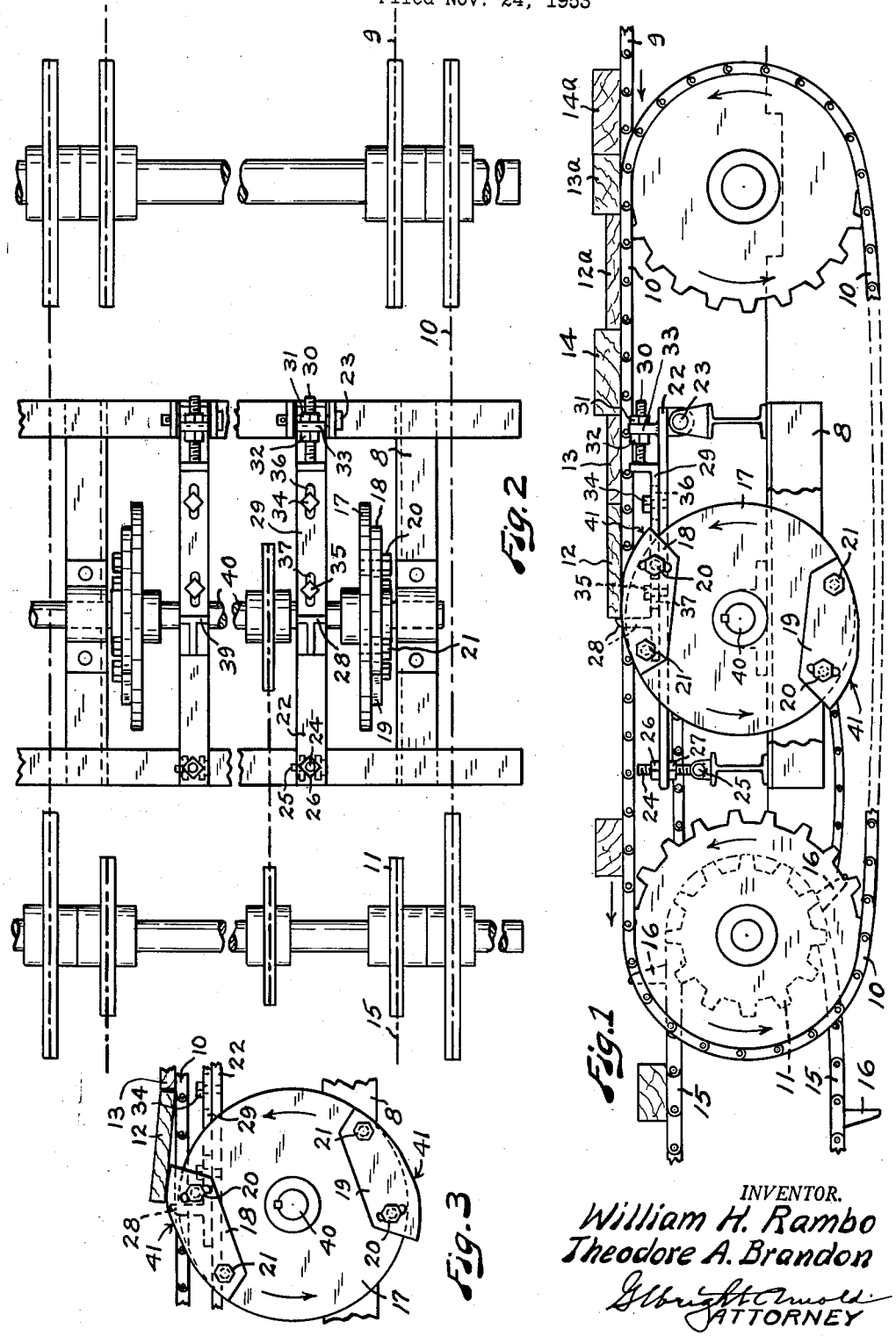
INVENTOR.
William H. Rambo
Theodore A. Brandon
ATTORNEY

United States Patent Office 3,031,061
Patented Apr. 24, 1962

3,031,061
AUTOMATIC UNIT FEEDING AND SPACING MECHANISM
William H. Rambo and Theodore A. Brandon, both of Loyalty Bldg., Portland, Oreg.
Filed Nov. 24, 1953, Ser. No. 394,055
6 Claims. (Cl. 198—34)

Our invention relates to the art of automatic unit feeding and spacing mechanism.

More particularly our invention relates to an automatic unit feeding mechanism which separates units of a series by uniform spaces for further individual unit processing or treatment, that is, our invention relates to feeding units to a succeeding operation which requires accurate spaced delivery.

Our invention is characterized by being peculiarly adapted for use in connection with the problems presented by lumber which requires processing. Its positiveness in accuracy of operation and simplicity which means reliability and low maintenance cost in use with varying widths of boards, varying thicknesses and varying lengths renders it peculiarly adapted to the handling of such lumber product. Accordingly, for purposes of clearness and definiteness of description, our invention will be described in connection with lumber handling although it will be understood that the same extends to all cases where like problems exist relative to positioning units.

In sorting lumber the units come from the trimmer in varying widths, lengths and thicknesses. As delivered by the lumber trimmer, they are conveyed sidewise in direction of travel on parallel and laterally spaced belts in side by side contacting relation. In order to provide for sorting these units they must be transferred to a separate conveyor in like sidewise position on which conveyor they will be spaced longitudinally and uniformly in direction of travel so that they may be subsequently processed, i.e., those of one width and length will be deposited in one pocket or receptacle while those of different lengths and widths will be transferred and deposited in other pockets or receptacles.

It is a principal object of our invention to provide a feeding mechanism which will accurately and positively automatically separate the units even varying in width so that they may be further processed, that is, whether such boards are enroute from the sawing operation (edgers or gang saws) or from or to trimmers or to further processing. Also, it is an object of our invention in doing this to provide a mechanism which is simple in construction and therefore requiring little maintenance and also to provide a mechanism which is economical to manufacture.

A principal, primary and fundamental purpose of our invention is to provide a feeding mechanism having a stop as part of the same which will provide definite and uniform spacing in direction of feed with minimum displacement of lumber in so doing, and even when these units are of varying widths without adjustment of the stop or mechanism for each special width within certain limits.

The above mentioned general objects of our invention, together with others inherent in the same, are attained by the device illustrated in the following drawings, the same being merely a preferred exemplary form set forth by way of illustration and not limitation throughout which drawings like reference numberals indicate like parts:

FIGURE 1 is a view in side elevation of the feeding mechanism embodying our invention showing the end portion of a first conveyor means coming from a lumber processing operation either sawing, edger or gang, or other operation, a second conveyor with which the cam wheel is associated and the beginning of a third conveyor for the lumber or units after being spaced in direction of travel which may be enroute to trimmer mechanism or other mechanism;

FIG. 2 shows a plan view of the same; and

FIG. 3 is a fragmentary view in elevation of the feeding means showing the cams in a different position than FIG. 1 and showing a board raised as to its front edge to clear and be tipped over a stop member.

A driven conveyor belt 10 receives lumber or units from the conveyor 9 coming from a lumber processing operation either edger, or gang, or other operation in a saw mill in mixed relation, as boards 12, 13, 14, 12a, 13a, 14a, that is, the boards are of varying widths and thicknesses and lengths and are moved forward in side by side and in intermixed relation enroute to a trimmer or sorter or other processing. The providing of a separate conveyor 10 is preferred since it renders very definite and accurate the operation of the cam on the cam wheel in separating the units. However, the conveyor 9 may be employed to carry the units against a stop and over the cam wheel.

A sprocket 11 actuated by a conveyor chain 15 which has lugs 16 evenly spaced thereon and to which delivery of the units or boards is to be made so that one unit or one board will be deposited between the lugs.

Also sprocket 11 actuates the cam wheel 17 the sprocket drive of which has a gear ratio which provides the same rate of revolving for cam wheel 17 as obtains for sprocket wheel 11.

Cam wheel 17, as here illustrated, has a pair of adjustable cam segments 18 and 19 mounted with an angle of 180° separation on cam wheel 17 by bolts 20 and 21. The number of said segments, of course will depend upon the specific requirements of a particular installation. The bolt 20 on the trailing end of the cam segment 18 is mounted in a slot in the segment whereby such trailing end may be adjusted above the circumference of cam wheel 17 as may be required, said segment pivoting upon bolt 21.

On base 8 is mounted the cam wheel 17, and also on base 8 is mounted plate or bar 22 preferably with one end pivotally mounted on bolt or pin 23 and the other end adjustably mounted on threaded member 24 which in turn is pivoted at 25 and has lock nuts 26 and 27, whereby said plate 22 may be adjusted as to height. On said plate 22 is adjustably mounted a stationary stop 28 adjustable both vertically as the same is mounted on said plate 22 and is adjustable longitudinally by reason of being mounted upon plate 29 which has threaded screw 30 on one end portion held by lock nuts 31 and 32 in upright fixed lug 33, the opposite end of plate 29 being held by bolts 34 and 35 disposed in longitudinal slots 36 and 37. There may be other stop members 39, see FIG. 2, which have identical construction in all respects to plate 22 as to mounting and adjusting parts and accordingly the same will not be described further. In this manner aligned stops may be provided for varying lengths of the lumber being conveyed over conveyor 10.

The speed of conveyor belt 10 with respect to the speed of conveyor chain 15 is such as in general to synchronize the depositing of the lumber from conveyor 10 between the lugs 16 of conveyor chain 15.

The stationary stop 28 protrudes above the plane of conveyor 10 preferably a little above the center of the thinnest board that would be engaged or encountered, the unit engaging the front edge of the stop 28 preferably being in a vertical plane common to the center of the shaft 40. This provides for the cam segment 18 to gradually rise above the circumference of the cam wheel 17 to a height necessary to raise the front edge of the unit or board above the stationary stop 28, see FIG. 3, thereby allowing the pressure of the series of boards in the rear to push or tip over the cam raised front edge of the board over the stop 28, the cam only raising the board slightly above the stationary stop. The curve of the cam face 41 is a gradual curve so that the front edge of the board is raised gradually, preferably without jerks or suddenness so that the pressure of the following boards may press the boards or units forward and tip them over the top of the stop in an even and uninterrupted manner, with the least possible displacement of the unit, thus a sudden jam in the travel of the boards or units which are being carried forward is avoided. Since the cam face directly engages the unit as the lumber unit (for example and not limitation), the cam serves to advance the lumber unit past the stop 28, as well as raise the leaning edge of the unit. Thus two advancing conveying forces operate or are simultaneously generated in the invention of applicant to move and facilitate further advancement of the lumber units longitudinally of the feeding and spacing mechanism; (a) the pressing or pushing of the following units or boards being fed, and (b) the forwardly advancing acting force generated by the cam. The height of the cam face 41 above the circumference of the cam wheel prevents the unit or board with its front edge raised from falling back and therefore assures its front edge being raised above the top of the stationary stop 28 sufficiently to tip it thereover.

The mode of operation has been set forth to a considerable extent in the above according to which it is clear that the feeding device of our invention is characterized by its automatic action, positiveness of operation and simplicity of construction which means that it requires little maintenance and that it will accurately perform its functions of introducing a space between units of a series on a conveyor belt even when these units vary as to width, thickness and length and though they come to the device in intermixed order. The period of time to push a wide board over the stop 28 will be somewhat longer than that to move a narrower board. However, the spacing of the lugs upon the sprocket chain 15 is such as to render such difference in time of no practical concern. The timing is such as to deposit the board or unit in front of a lug 16 on the sprocket chain 15 and the space between the lugs would then take care of any slight difference in time in moving or tipping a wide board 12 over the stop 28 in contrast to the time required to move or tip a narrow board 13a over the stop 28. The cam structure and its mounting with respect to the stationary stop functions to have the face 41 of the cam segments 18 and 19 gradually lift the front edge of the units and clearing the front edge of the stop so that the pressure of the succeeding boards in the series operates to push or tip the unit or board over the stop 28 and cause it to fall upon the conveyor to the rear of the stop and thereby set it free to travel forward on the conveyor belt 10. It will be understood that when the forward movement of the series of boards 12, 13 and 14 is stopped by the stationary stop 28, the conveyor belt 10 continues to pass therebeneath and the moment a board has its front edge freed to pass or tip over the stop 28, the series of boards automatically resumes its forward advance until the leading unit or board engages stop 28.

We claim:

1. An automatic unit feeding and spacing mechanism, comprising a unit conveyor surface having longitudinal portions thereof disposed in spaced relation; a unit stop disposed in the path of units carried on said conveyor surface and extending slightly above the plane of said conveyor surface; and a revolving cam disposed below said stop having its axis of rotation stationed beneath the conveyor surface having arranged thereon a cam point of greatest radius rising slightly above the top of the unit stop.

2. An automatic unit feeding and spacing mechanism, comprising a plurality of unit parallel longitudinally disposed conveyor chains; a unit stationary stop extending slightly above the conveyor; and a revolvable cam disposed below said stop and mounted between said conveyor chains with a cam point rising periodically above the top of the stop, said revolvable cam having its axis of rotation fixed with respect to said stationary stop.

3. An automatic lumber unit feeding and spacing mechanism, comprising a plurality of lumber unit parallel and longitudinally disposed conveyors on which lumber units to be conveyed are carried side by side in contacting relation; a unit stop for each conveyor extending slightly above the surface of said conveyor and located laterally in aligned relation in the path of the lumber units carried on said conveyor; and a revolvable cam segment having the circumference of its outer face gradually rising in revolving above said top of the conveyor in lifting the lumber units above said stop while the lumber unit next following and carried by the conveyor pushes the lifted lumber unit forward and over said stop.

4. An automatic unit feeding and spacing mechanism, comprising a plurality of unit parallel longitudinally disposed conveyors, the top surface of each lying in the same plane, on which conveyors units having length and breadth to be conveyed are carried side by side in contacting relation; a unit stop for each conveyor extending slightly above the surface of said conveyor and located laterally in aligned relation in the path of the units carried on said conveyor in holding back the advance of said units while the conveyor moves thereunder; and a revolving periodically timed cam disposed adjacent that side of the stop which engages the units and extends upwardly in lifting the leading edge of the engaged unit above said stop while being pressed forward over said stop by rearwardly disposed units.

5. An automatic lumber unit feeding and spacing mechanism comprising a plurality of lumber unit parallel longitudinally disposed conveyor chains for lumber units of varying widths; a lumber unit stationary stop extending slightly above the conveyor; and a revolvable cam disposed below said stop and mounted between said conveyor chains with a cam point rising periodically above the top of the stop, said revolvable cam having its axis of rotation fixed with respect to said stationary stop.

6. An automatic lumber unit feeding and spacing mechanism, comprising a lumber unit of varying width conveyor surface having longitudinal portions thereof disposed in space relation; a unit stop disposed in the path of said units of varying length carried on said conveyor surface and extending slightly above the plane of said conveyor surface; and a revolvable cam disposed below said stop having its axis of rotation stationed beneath the conveyor surface having arranged thereon a cam point of greatest radius rising slightly above the top of the unit stop in causing the cam face to directly engage a lumber unit.

References Cited in the file of this patent

UNITED STATES PATENTS

| | | |
|---|---|---|
| 845,152 | Weir | Feb. 26, 1907 |
| 2,670,835 | Huttmann | Mar. 2, 1954 |
| 2,675,119 | Birch | Apr. 13, 1954 |
| 2,679,919 | Koning | June 1, 1954 |
| 2,731,130 | Blickenderfer | Jan. 17, 1956 |
| 2,743,000 | Hedlund et al. | Apr. 24, 1956 |